(12) United States Patent
Summers

(10) Patent No.: US 7,886,477 B2
(45) Date of Patent: Feb. 15, 2011

(54) VISION ENHANCEMENT APPARATUS TO IMPROVE BOTH NEAR AND FAR VISION

(76) Inventor: Charles L. Summers, 438 Hill Rd., Boxborough, MA (US) 01719

( * ) Notice: Subject to any disclaimer, the term of this patent is extended or adjusted under 35 U.S.C. 154(b) by 747 days.

(21) Appl. No.: 11/500,701

(22) Filed: Aug. 8, 2006

(65) Prior Publication Data

US 2008/0034637 A1 Feb. 14, 2008

(51) Int. Cl.
*F41G 1/00* (2006.01)
(52) U.S. Cl. .......................................... 42/133; 42/113
(58) Field of Classification Search ................. 42/113, 42/130, 131, 133
See application file for complete search history.

(56) References Cited

U.S. PATENT DOCUMENTS

| | | | | |
|---|---|---|---|---|
| 3,867,798 | A * | 2/1975 | Masucci | 451/42 |
| 5,157,839 | A * | 10/1992 | Beutler | 33/265 |
| 6,113,233 | A * | 9/2000 | Miller | 351/46 |
| 6,170,952 | B1 * | 1/2001 | La Haye et al. | 351/168 |
| 2003/0048406 | A1 * | 3/2003 | Morrison | 351/44 |

OTHER PUBLICATIONS

"Lyman Hawkeye Shooter's Optic Aid".
"Hawkeye Shooters Optic Aid", Bownells, Inc. 2005, All Rights Reserved, <http://www.brownells.com/aspx/ns/store/ProductDetail.aspx?p=19702&title=HAWKEYE%7e+SHOOTERS+OPTIC+AID>.
"Cabela's World's Foremost Outfitter, Hunting, Fishing, Outdoor Ger" Cabela's In. 1996-2005 All Rights Reserved, <http://www.cabelas.com/cabelas/en/templates/links/link.jsp?id=0031491227369a&type=products&cmCat=search&returnPage=search-results1.jsp&QueryText=Hyskore&N=4867&Ntk=Products&Ntx=mode+matchall&Nty=1&Ntt=Hyskore&noImage=0>.
"Vision and Sightin Solutions" Merit Coporation 2006 <http://www.meritcorporation.com/index-2.html>.
Eli Peli, "Driving with Confidence: A Practical Guide to Driving with Low Vision", World Scientific.

* cited by examiner

*Primary Examiner*—Stephen M Johnson
(74) *Attorney, Agent, or Firm*—Cesari and McKenna, LLP

(57) ABSTRACT

A method for aiming a firearm by a person is disclosed. A collimator of static cling vinyl is attached to a lens of eyeglasses worn by the person. The collimator has an aperture formed in opaque material. A sight line is generated from an eye of the person through the aperture of the collimator, through a rear sight of the firearm, across a front sight of the firearm, and to the target. The aperture of the collimator optically clears the vision of the eye of the person to aid in the person's simultaneous visualization of the rear sight, the front sight, and the target.

8 Claims, 20 Drawing Sheets

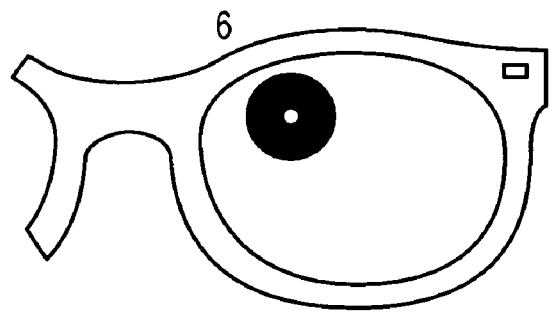
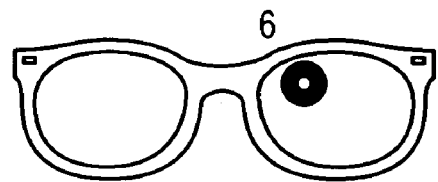
FIG. 3C PRIOR ART    FIG. 3D PRIOR ART
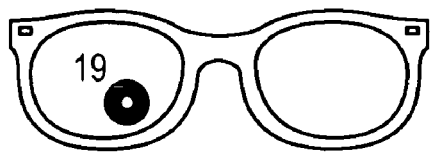
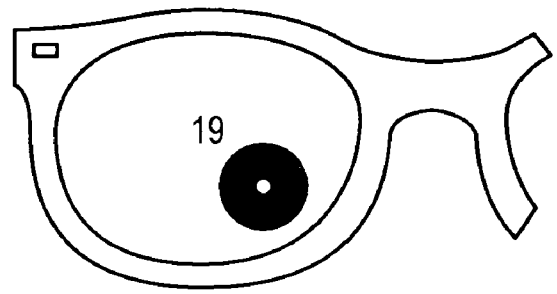
FIG. 3E PRIOR ART    FIG. 3F PRIOR ART

VISION ENHANCEMENT APPARATUS TO IMPROVE BOTH NEAR AND FAR VISION

FIELD OF THE INVENTION

This invention relates to vision enhancement apparatus, and in particular to simultaneous improvement of both near and far vision. For example, the vision enhancement is applicable to improved sighting of firearms, where it is important for a person aiming firearms to simultaneously visualize a rear sight, a front sight, and the target. The rear sight is in the person's near vision, the front sight is in the person's intermediate vision, and the target is in the person's far vision. A person who is either near-sighted or far-sighted is greatly helped by the simplicity of the present invention.

BACKGROUND OF THE INVENTION

Many ideas have been applied to solve the problem of a person with impaired vision, such as either near-sightedness or far-sightedness, to aim a firearm. Aiming, for example, a rifle equipped with open sights requires that the person simultaneously visualize a rear sight, a front sight, and the target. The rear sight may be an open iron sight at about 12 inches to 18 inches from the person's eye. The front sight is another approximately 2 to 3 feet further away, near the muzzle of the rifle. The target is at optical infinity, perhaps a few hundred feet to several thousand yards away. A person who cannot properly accommodate the lens of his/her eye to focus simultaneously to the rear sight, the front sight, and the target is unable to accurately aim the rifle.

For example, telescopes have been adapted as sighting devices for rifles. The telescope receives light rays at its objective lens which have been reflected by the target. The path of the light rays is appropriately modified by lenses of the telescope, and exit from the eyepiece of the telescope. The person adjusts the focus of the telescope so that he can simultaneously visualize both a cross hair located in the telescope and the target. The telescope is aligned with the rifle so that when the cross hair appears to coincide with the target, the flight of the bullet will follow a substantially Galilean trajectory (allowance being made for air resistance) and strike the target at the spot indicated by the intersection of the cross hairs. However, a telescope is a complicated attachment to a rifle, and so does not solve the problem of using open sights by a person who is unable to simultaneously visualize a rear open sight, a front sight, and the target. Further, telescope sights are expensive, and when a person owns several rifles, the cost of a telescope sight for each becomes prohibitive.

Peep hole sights have been tried as solutions to the problem of simultaneous visualization of a rear sight, a front sight, and a target for aiming a rifle. A typical prior art peep hole sight is shown in FIG. 1. A small hole 2 in a metal plate 4 is positioned to serve as a rear sight. A small hole used as a sight is often referred to as a "peep hole sight". A peep hole sight as shown in FIG. 1 is often referred to as a tang-mounted peep hole sight.

A suction cup has been used to attach a peep hole sight to eyeglasses, as shown in FIG. 2A and FIG. 2B. Both transparent (shown in FIGS. 2A and 2B) and opaque (not shown) suction cups have been used. The suction cups refract light and are very distracting to the person trying to aim the firearm. Suction cup 3 adheres to lens of eyeglasses 7 by atmospheric pressure pressing to fill a vacuum between suction cup 3 and lens of eyeglasses 7. Peep hole sight 9 is held onto eyeglasses by suction cup 3, and ultimately by atmospheric pressure holding suction cup 3 onto lens of eyeglasses 7. Peep hole sight 9 has a portion 5 which surrounds a portion of suction cup 3, and so binds the peep hole sight 9 to the suction cup 3.

Vision impaired individuals are assisted in driving an automobile by attachment of a small telescope 13 to ordinary eyeglasses, as shown in FIG. 3A, and the small telescope may be called a "BIOptic". FIG. 3B shows a group of fitting apertures used in preparing a BIOptic for a patient. The numbers 14, 16, 19, 22, 24, 27, and 33 beside the apertures indicate the diameter of the apertures. Placement of the fitting aperture on eyeglasses is shown in FIG. 3C. Fitting a BIOptic to a patient is shown in FIG. 3G and FIG. 3H, including the use of a protractor with a fitting aperture to measure a mounting angle for a BIOptic.

When a firearm is equipped with open sights, such as a "notch" type rear sight and a "post" type front sight, a person who is either near-sighted or far-sighted has difficulty, and often finds it impossible, to visualize both the rear sight and the front sight, along with the intended target. Accordingly, the person has great difficulty in aiming the firearm.

The problem of a person with impaired vision, such as either nearsightedness or far-sightedness, to aim a firearm equipped with open sights has not been solved.

SUMMARY OF THE INVENTION

A small aperture in an opaque material is attached to a pair of glasses worn by the person aiming a firearm. The small aperture collimates the light reflected from the rear sight, the front sight, and the target so that the light from each passes through only a small area of the lens of the person's eye on its way the person's retina. The opaque material is spoken of as a collimator, and the light is collimated by the aperture. Accordingly, only a small area of the person's lens, and then retina, is illuminated by a cone of light rays passing through the aperture. Accordingly, all of the light is rendered into focus on the person's retina. The person can then see all three, the rear sight, the front sight, and the target together. The person can then accurately aim the firearm.

The aperture may be conveniently formed in a circular piece of opaque static cling vinyl. The aperture may have a size range of one to one and a half millimeters. The diameter of the circular piece of opaque static cling vinyl may be conveniently around 15 to 20 millimeters (about ¾ inch). Static cling vinyl has an electrostatic property that causes it to be electrically attracted to many materials, especially materials which eyeglasses are made of.

The glasses worn by the person may be ordinary vision correction glasses, may be made of polycarbonate such as used in prescription safety eyeglasses, may be bifocals with visible lines between different radii ground into the glasses, may be blended lens bifocals, may be safety glasses such as the sort which people firing a firearm wear for mechanical protection of their eyes, may be ordinary sunglasses, etc.

BRIEF DESCRIPTION OF THE DRAWINGS

Turning now to the Drawings, in which like numerals indicate like parts in the several drawings.

DETAILED DESCRIPTION

Figure 1:
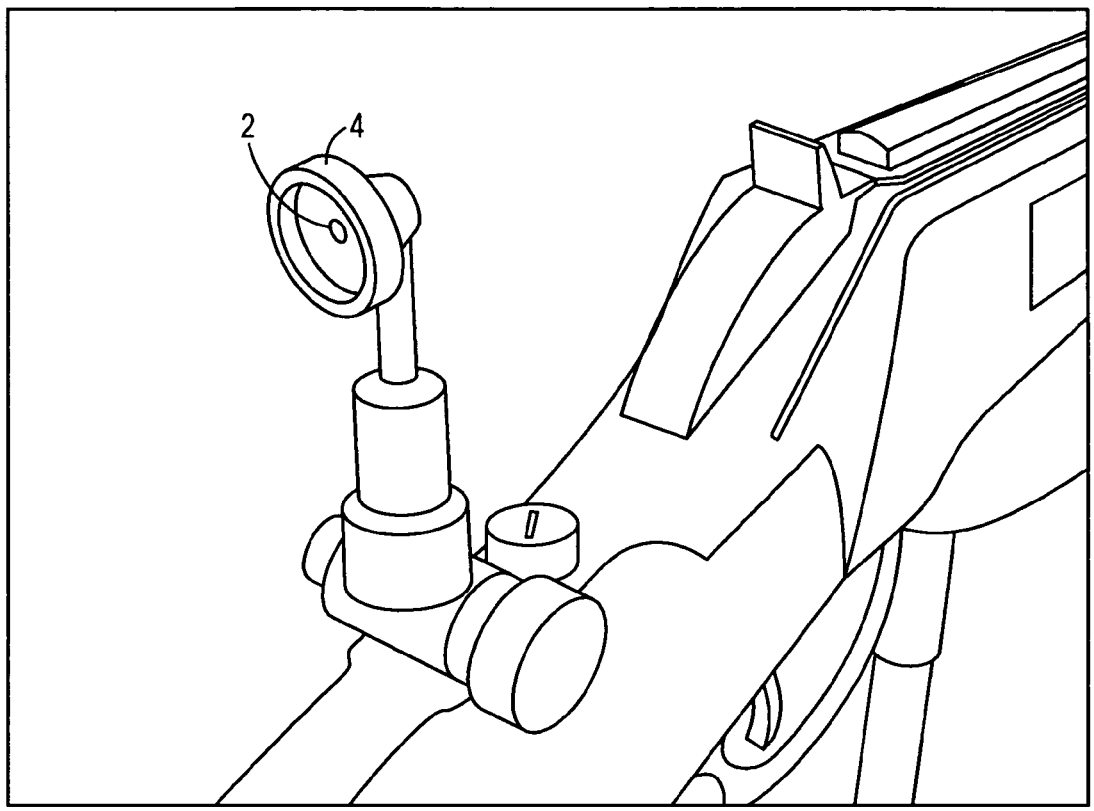
FIG. 1 is a tang-mounted peep sight of prior art.
Figure 2A:
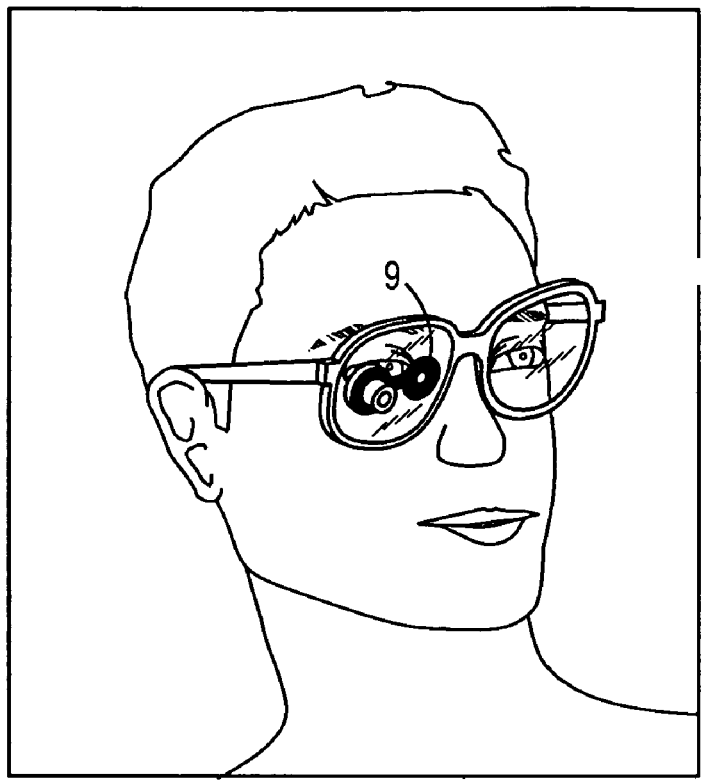
FIG. 2A is a suction cup attachment of prior art.
Figure 2B:
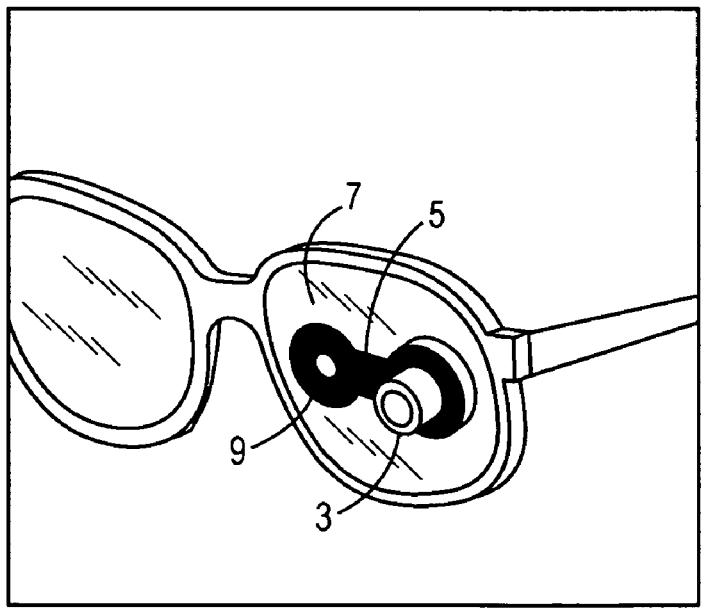
FIG. 2B is a close up of the suction cup of FIG. 2A.
Figure 3A:
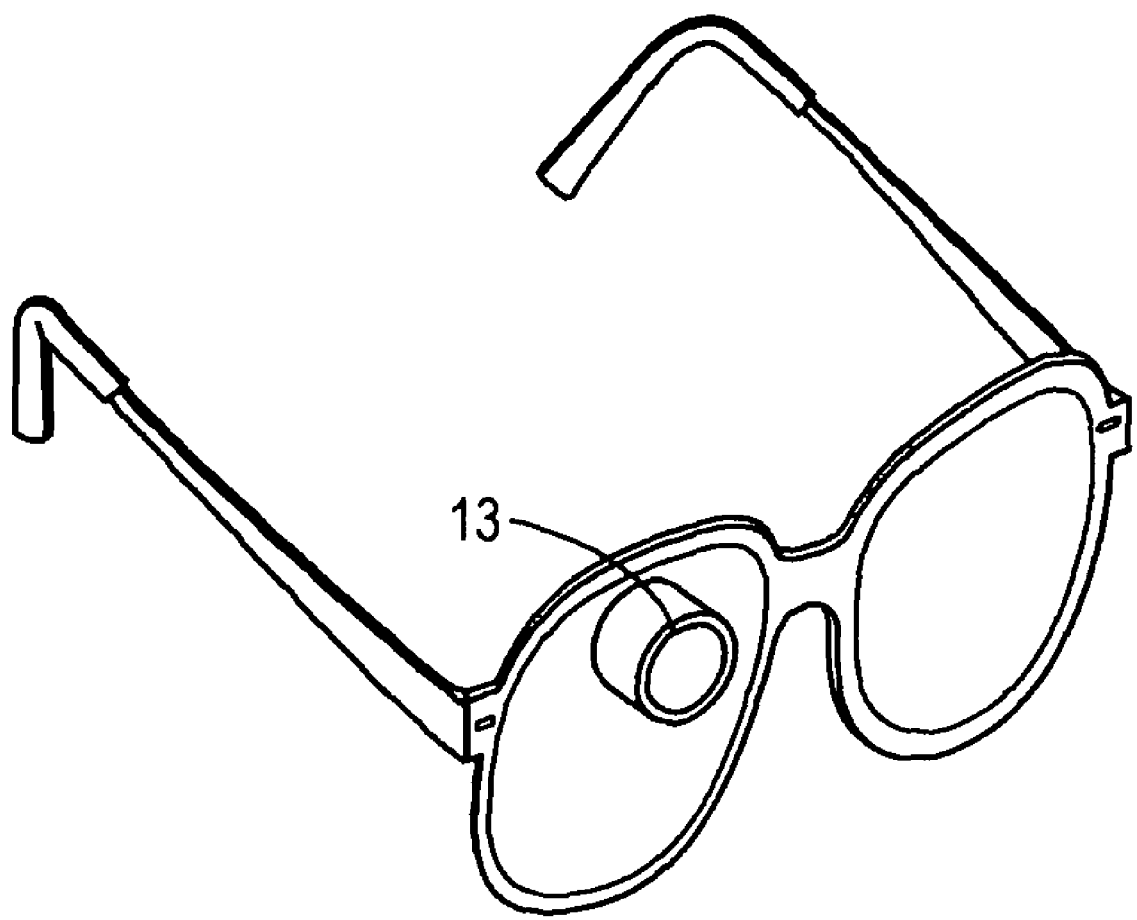
FIG. 3A . . . 3H is a BIOptic attachment for eyeglasses, with a centering method for a telescope attached to eyeglasses of prior art.
Figure 3B:
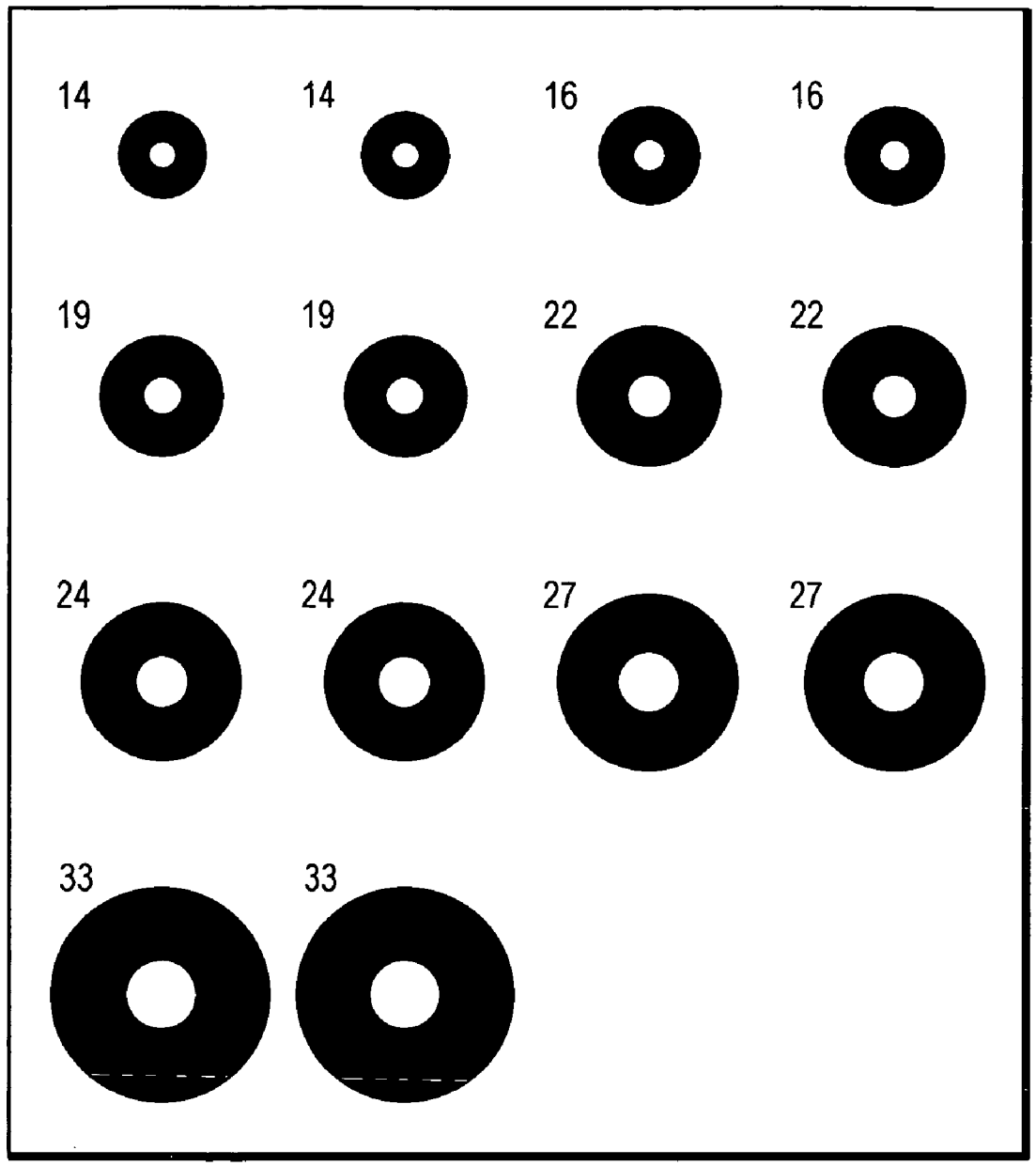
Figure 3G:
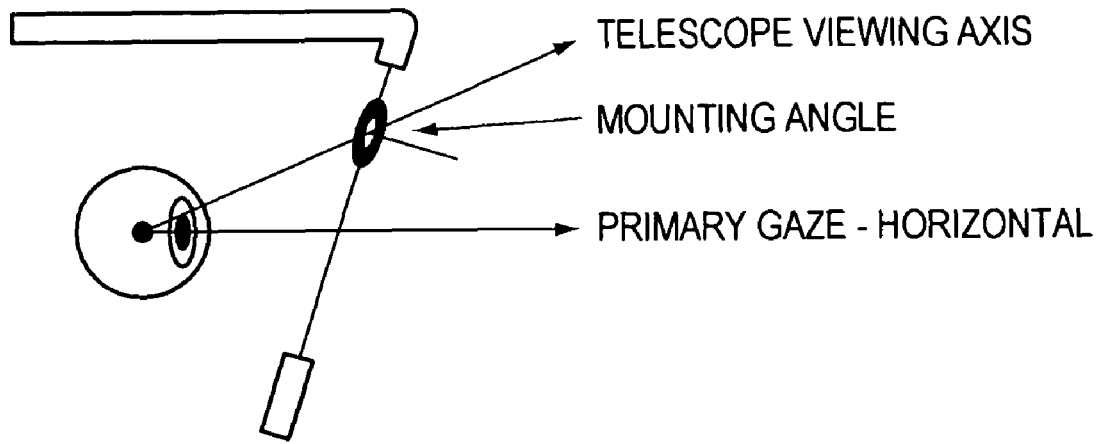
Figure 3H:
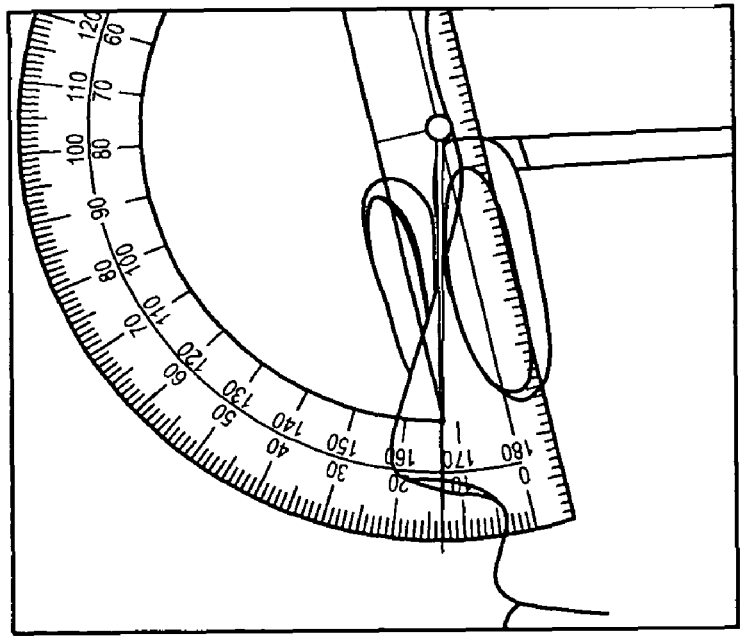
Figure 4:
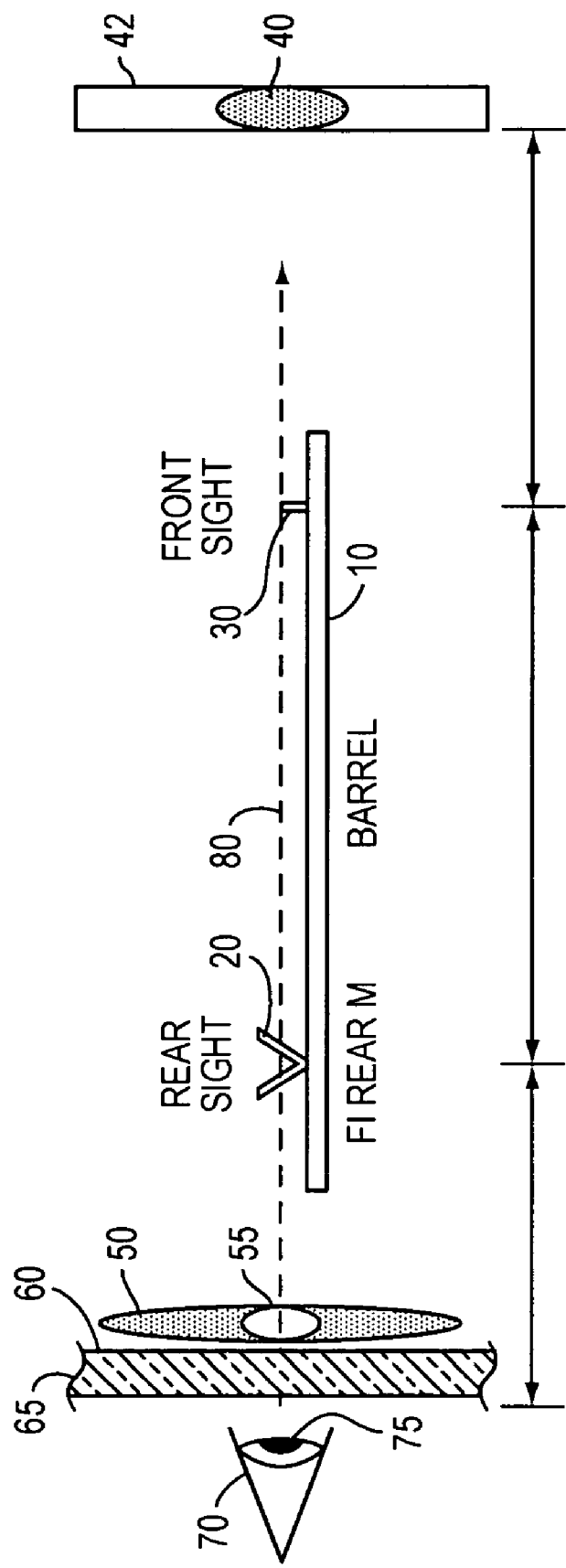
FIG. 4 is side view of the invention.

Turning now to FIG. 4, a side view schematic diagram of use of the invention is shown. A firearm barrel 10 has a rear open iron sight 20 and a post front sight 30. It is intended to aim the firearm with barrel 10 at target 40. The inventive optical device 50, hereinafter referred to as an "Eye Pal", is attached to a front surface 60 of a lens 65 of eyeglasses worn by a person (not shown) aiming the firearm at target 40. The mark "Eye Pal" is a registered trademark, Registration No. 3,542,503, of Resident Artist Studio, LLC of Boxborough, MA. The person's eye 70 has the pupil 75 aligned along sight line 80 (indicated by a dashed line) through an aperture 55 of the Eye Pal 50. Also, the line of sight 80 passes through the rear sight 20 and across the top of post sight 30, and extends beyond barrel 10 of the firearm to intersect the target 40. The rear sight 20 and front sight 30 are adjusted so that a bullet fired by the firearm with barrel 10 will travel along a Galilean trajectory (not shown) and hit the target 40 when the sight line, beginning at the pupil 75 of the person's eye 70, through the aperture 55 of the Eye Pal 50, and through the rear sight 20 and across the top of the post sight 30 intersects the bulls eye 40 of target 42.

The Eye Pal 50 is a collimator, and aperture 55 in Eye Pal 50 collimates the light. Eye Pal 50 is made of opaque material with a hole formed therein to form aperture 55. The opaque material stops unwanted light. A cone of light rays passing through the aperture 55 of the collimator Eye Pal 50 travels through lens 65 of eyeglasses (not shown in FIG. 4, but shown in FIG. 5A) so that the rays are substantially perpendicular to the plane of the lens. Also, the cone of rays enters the eye 70 of the person aiming the firearm with barrel 10 so that the rays impinge on only a small number of rods and cones (not shown) in the person's retina (not shown).

Figure 5A:
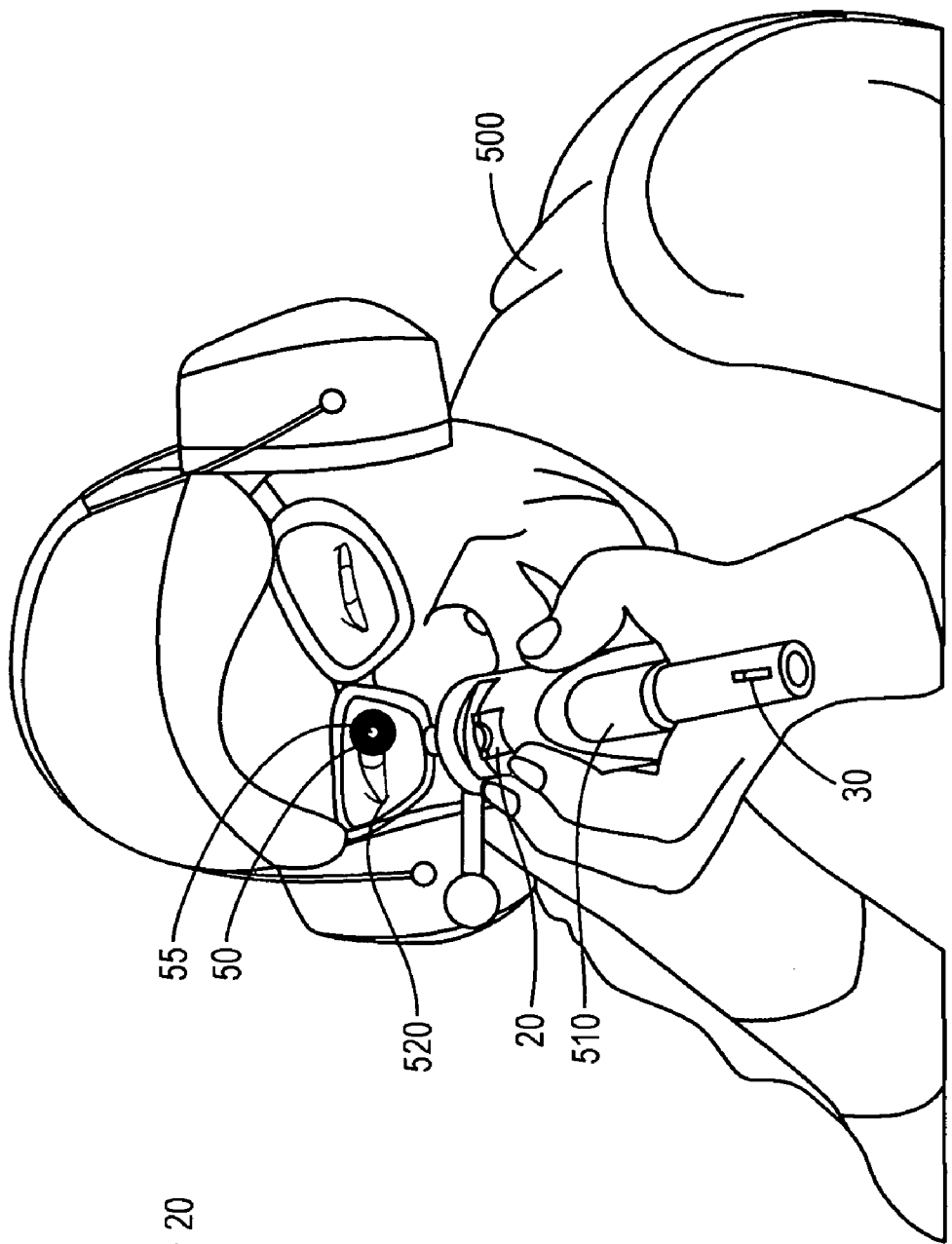
FIG. 5A is a front view of use of the invention.
Figure 5B:
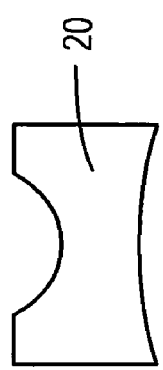
FIG. 5B is a front view of a rear sight.

Turning now to FIG. 5A, a person 500 is shown aiming rifle 510. The person 500 is wearing eyeglasses 520. An Eye Pal 50 is attached to eyeglasses 520, and aperture 55 is aligned with the pupil (not shown) of the eye (not shown) of person 500. The aperture 55 is small and difficult to see in FIG. 5A. Eyeglasses 520 are shown as a curved style as is commonly used in manufacture of sunglasses from a plastic material such as polycarbonate.

Figure 6:
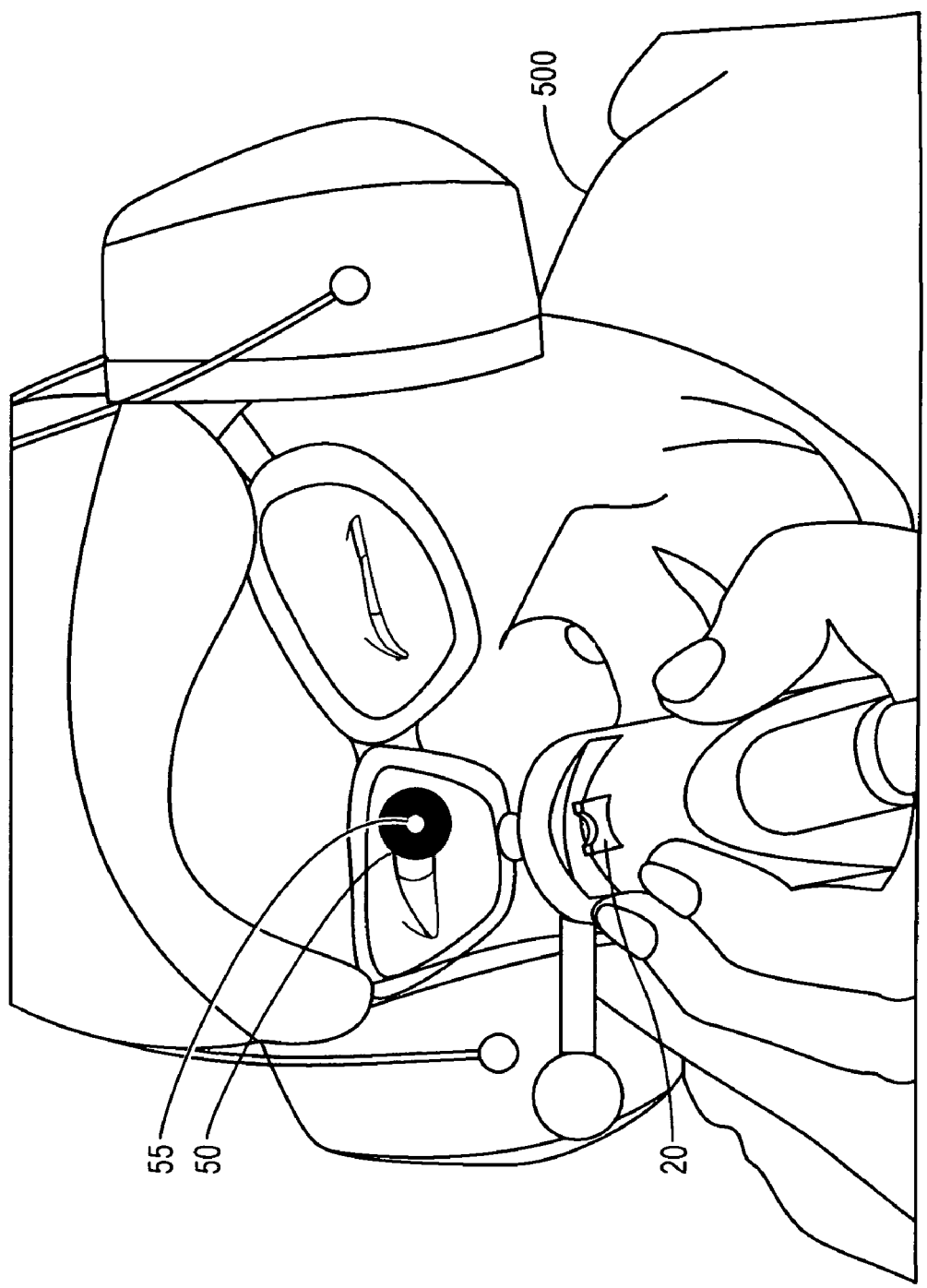
FIG. 6 is a close up view of use of the invention.

Turning now to FIG. 6, a close up view of person 500 is shown. Aperture 55 of Eye Pal 50 is more clearly visible in FIG. 6.

The Eye Pal 50 may be made by use of a mold using a liquid which solidifies into a static cling vinyl, by use of an injection molding process. Alternatively, a sheet of static cling vinyl may be punched out to form the inventive Eye Pal 50. The Eye Pal 50 is preferably made of opaque material so that it stops light except at the aperture 55 in the Eye Pal 50. Colors of static cling vinyl of black, red, green, and blue have all been found to be satisfactory.

Eyeglasses may be made of polycarbonate as safety glasses often are, and polycarbonate has been found to work satisfactorily with an Eye Pal 50 made of static cling vinyl. Other materials from which eyeglasses and safety goggles are made have also been found to work satisfactorily with static cling vinyl. The only requirement is that the Eye Pal 50 adhere by electrostatic attraction, or by any surface attraction, to the material of eyeglasses worn by the person aiming the firearm. Goggles (not shown) which fit over eyeglasses may also be used with an Eye Pal 50 adhered to the outer surface of the goggles.

Figure 7A:
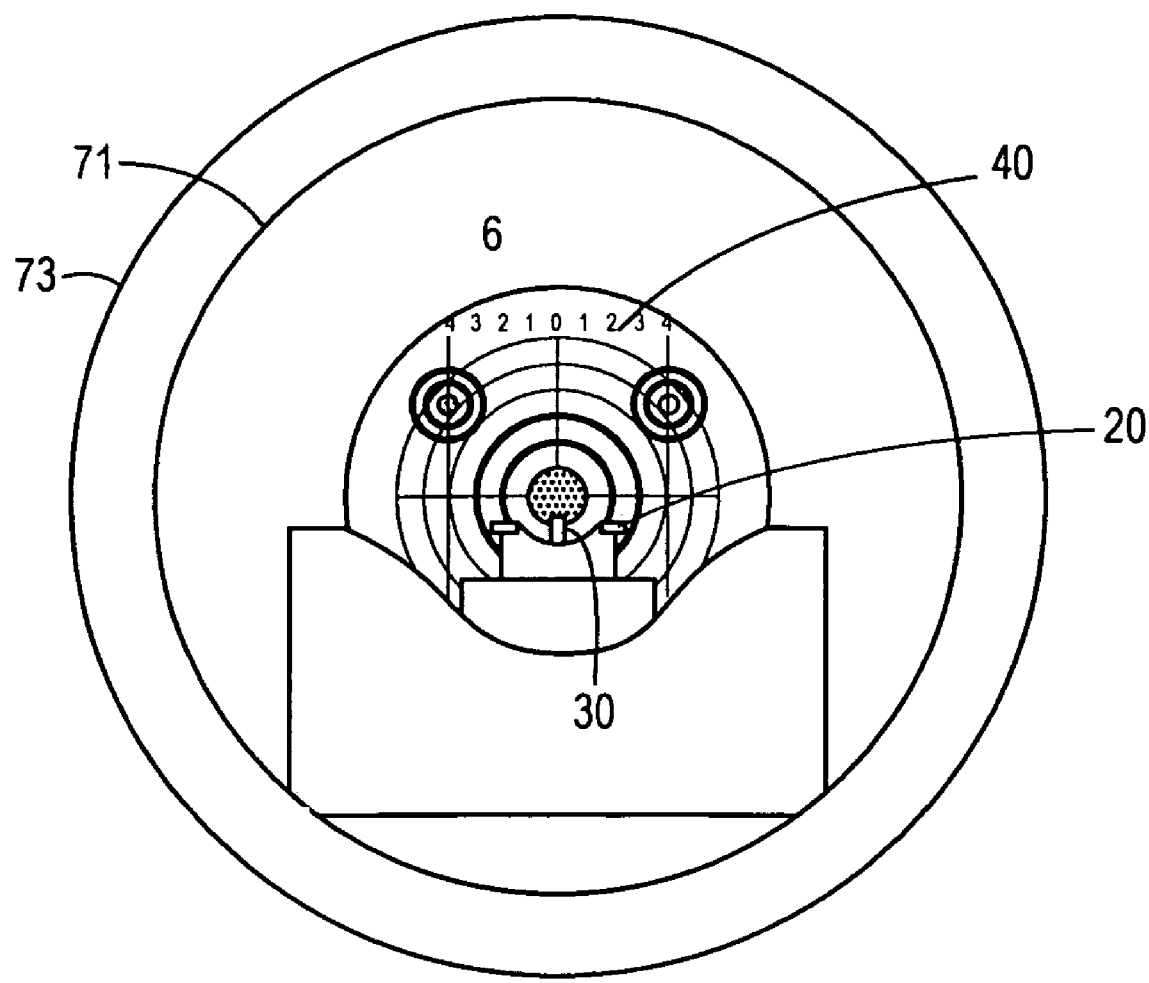
FIG. 7A is a view of firearm rear sight, front sight, and a target by a person using the invention.

Turning now to FIG. 7A, a target as visualized by a person is shown, where the person has impaired eyesight, and the person is sighting a rifle using the invention. The invention is being used as shown in FIG. 4, FIG. 5A, and FIG. 6. The target 40 is in focus and is visualized, the front sight 30 is in focus and is visualized, and the rear sight 20 is in focus and is visualized. FIG. 7A represents a photograph taken by a camera (not shown) occupying the position of the person's eye 70, as shown in FIG. 4. The camera (not shown) photographed the view observed by the person's eye 70 along sight line 80, using the invention.

Figure 9:
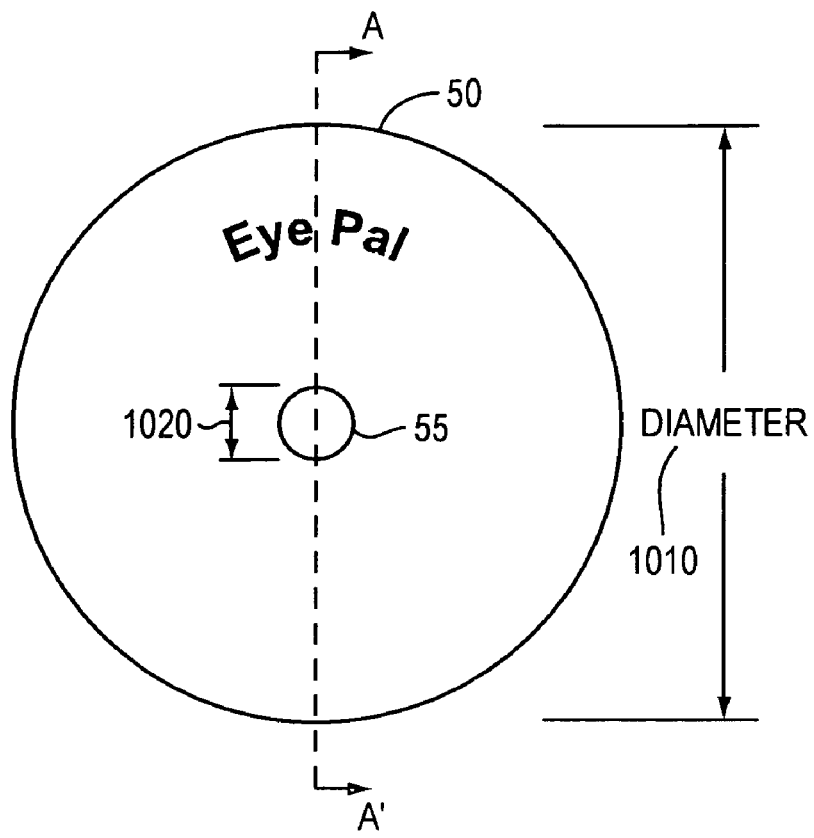
FIG. 9 is a front view of the invention showing section A-A'.

The view within the cone of light rays passing through aperture 55 is shown inside of circle 71. The view beyond outside diameter 1010 of the inventive Eye Pal 50, as shown in FIG. 9, is visualized beyond circle 73, by the person aiming the firearm. The view beyond outside diameter 1010, that is beyond circle 73, is not shown in FIG. 7A.

Figure 13:
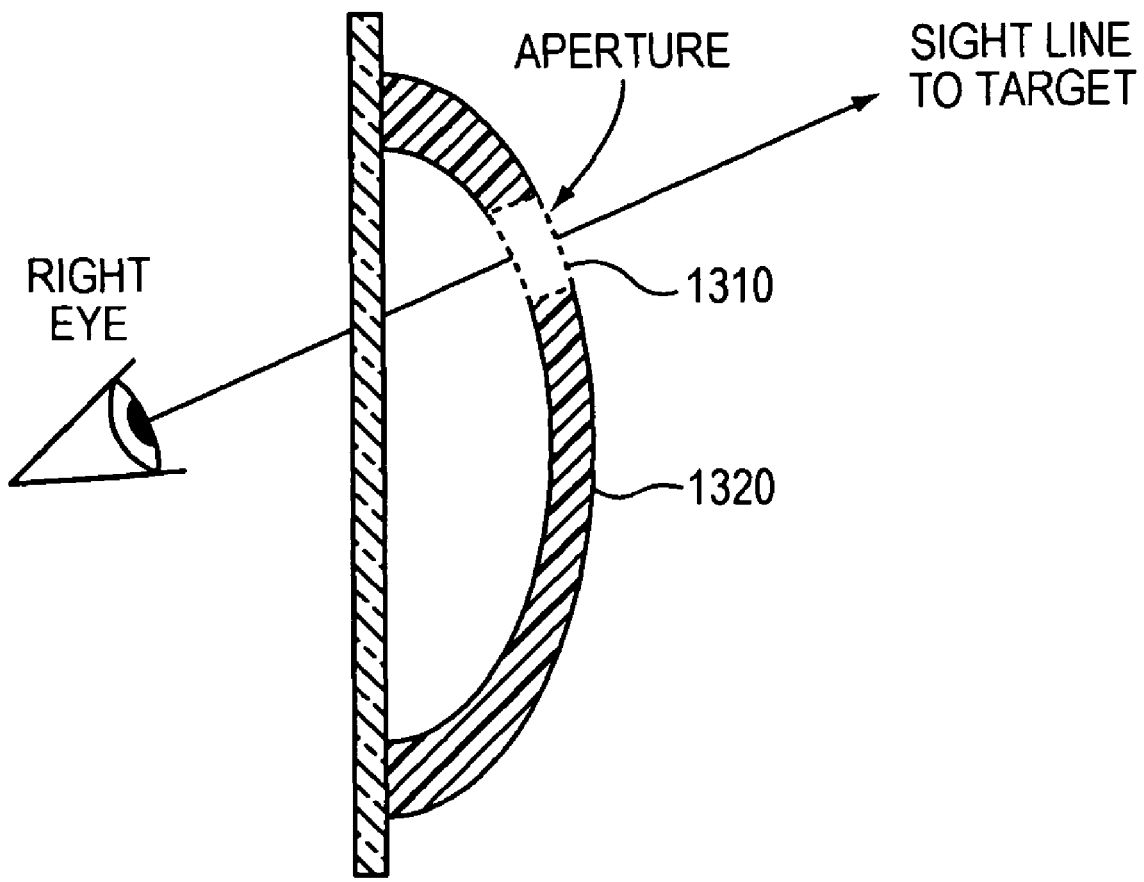
FIG. 13 is a sectional view, looking down, of an alternative embodiment of the invention with an off-center aperture, the section taken along section D-D'.
Figure 14:
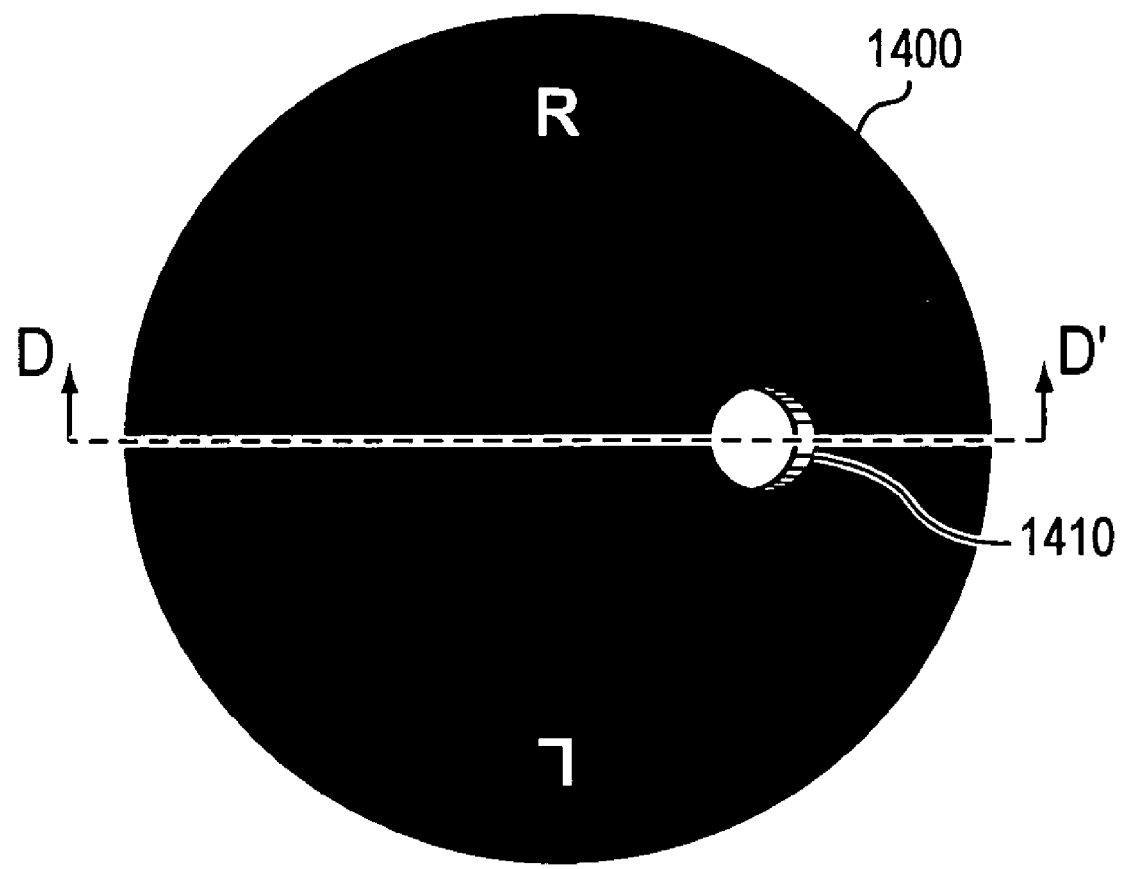
FIG. 14 is a front view of an alternative embodiment of the invention with an off-center aperture, and showing section D-D'.

The view beyond outside diameter 1010 is a distraction to the person using the inventive Eye Pal 50. This distracting view is reduced by placing aperture 55 off-center in the inventive Eye Pal 50, as shown in FIG. 13 and FIG. 14 and the associated discussion herein below.

Figure 7B:
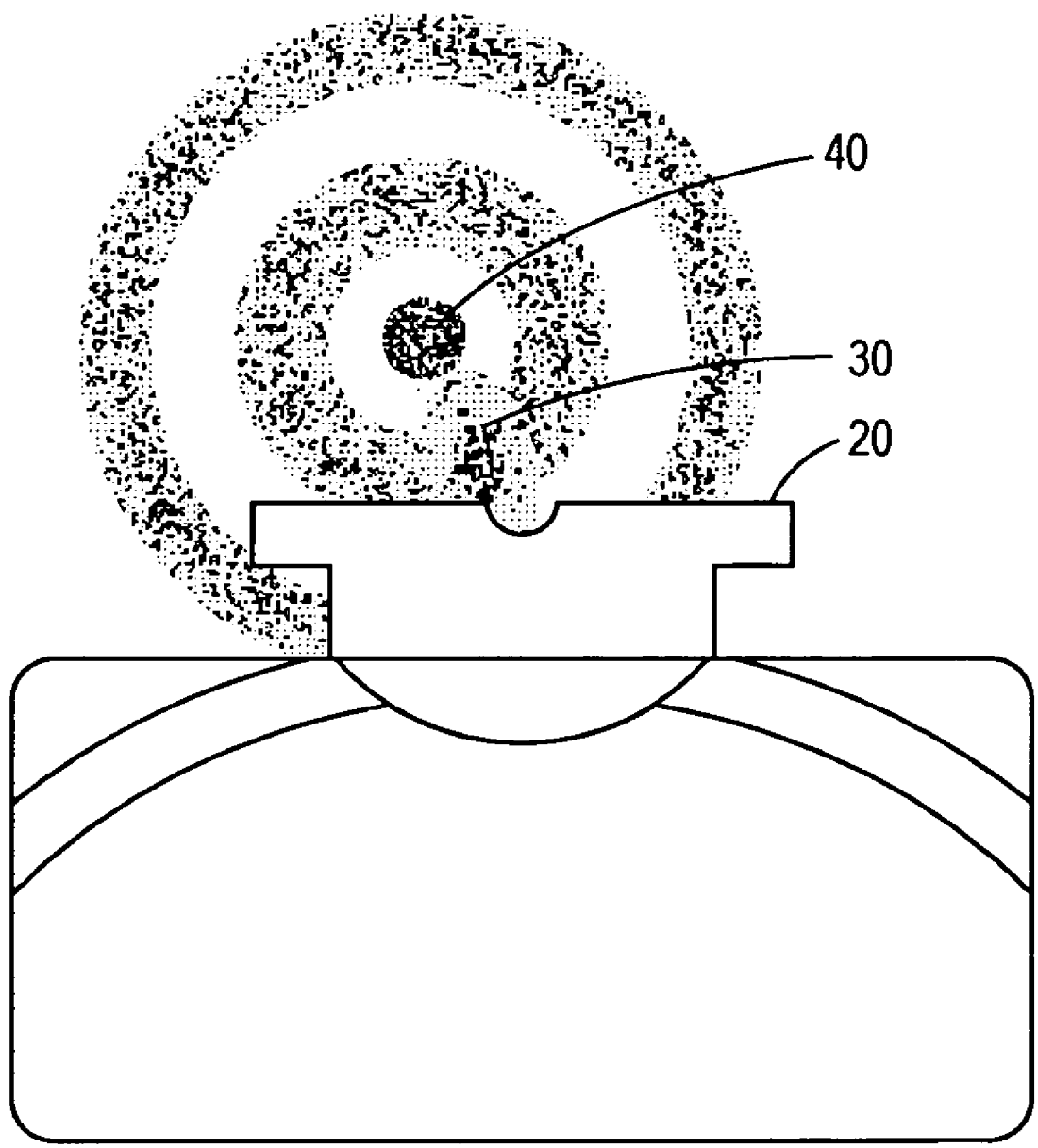
FIG. 7B is a view of firearm sights and target by a person with near-sighted vision, and without the invention.

Turning now to FIG. 7B, the target and rifle sights are shown as seen by a person with near-sighted vision impairment, and without the invention. The rear sight 20 is visualized. The front sight 30 is out of focus for the person and so is not visualized. The target 40 is out of focus, and so is not seen clearly. FIG. 7B illustrates a lack of alignment between rear sight 20, front sight 30, and target 40 because the person attempting to aim the firearm cannot clearly see the front sight 30 and target 40. The person attempting to aim the firearm will most likely miss the target when he fires the firearm because of his vision impairment of not being able to visualize the rear sight and simultaneously visualize the front sight and target.

Figure 7C:
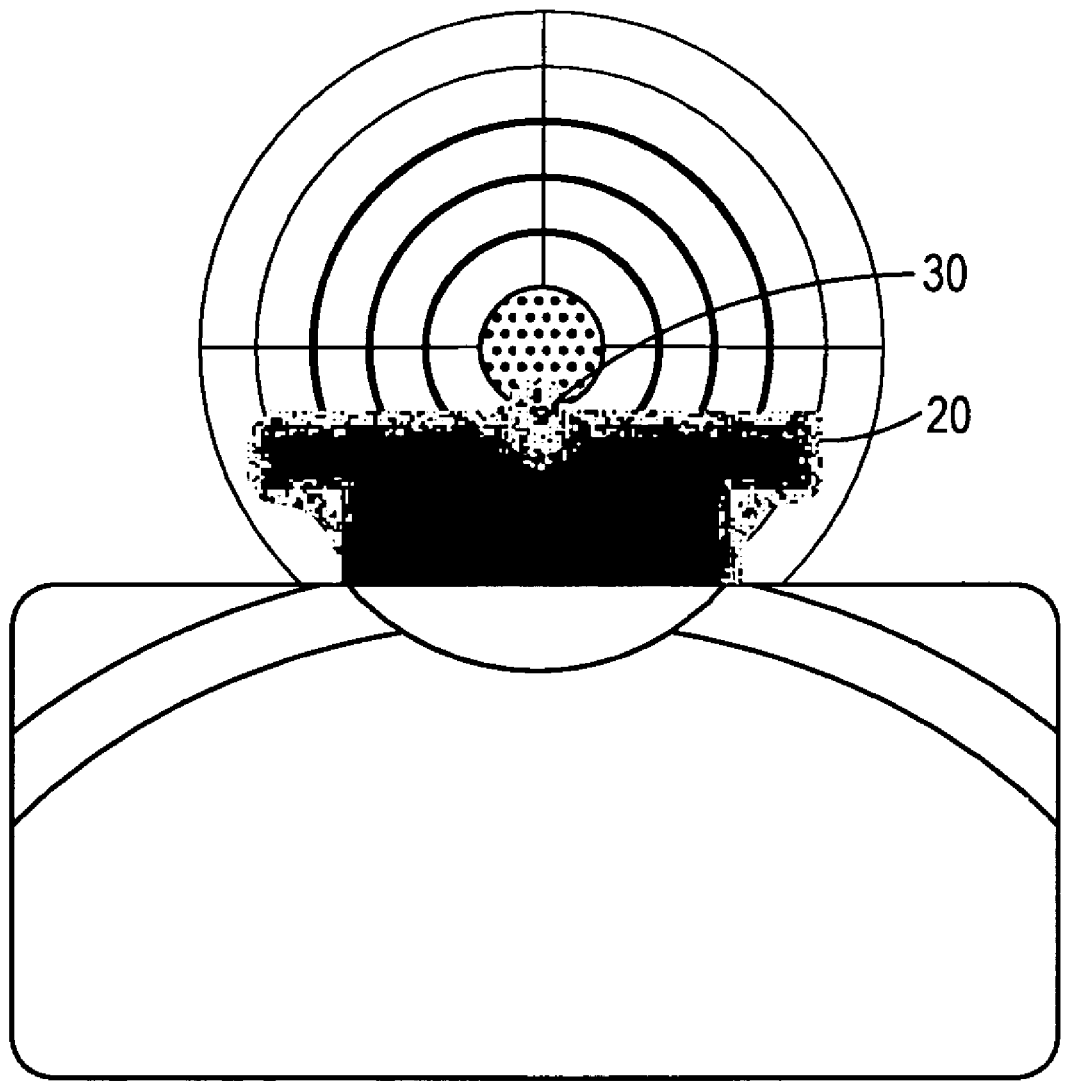
FIG. 7C is a view of firearm sights and target by a person with far-sighted vision, and without the invention.

Turning now to FIG. 7C, the target and rifle sight are shown as seen by a person with far-sighted vision impairment, and without the invention. Both the rear rifle sight and the front rifle sight are out of focus, and the target is in focus. FIG. 7C illustrates an alignment between the rear sight 20, the front sight 30, and the target, even though both the rear sight and the front sight are poorly visualized as illustrated by the fuzziness drawn into FIG. 7C. The alignment illustrated in FIG. 7C is more of a chance outcome rather than an intentional outcome because the person cannot visualize the rear sight and front sight clearly.

Accordingly, without the invention, neither a person with near-sighted vision impairment nor far-sighted vision impairment can aim the firearm. In contrast, the invention makes it possible for both individuals with both near-sighted vision impairment and far-sighted vision impairment to aim the firearm at the target.

Figure 8:
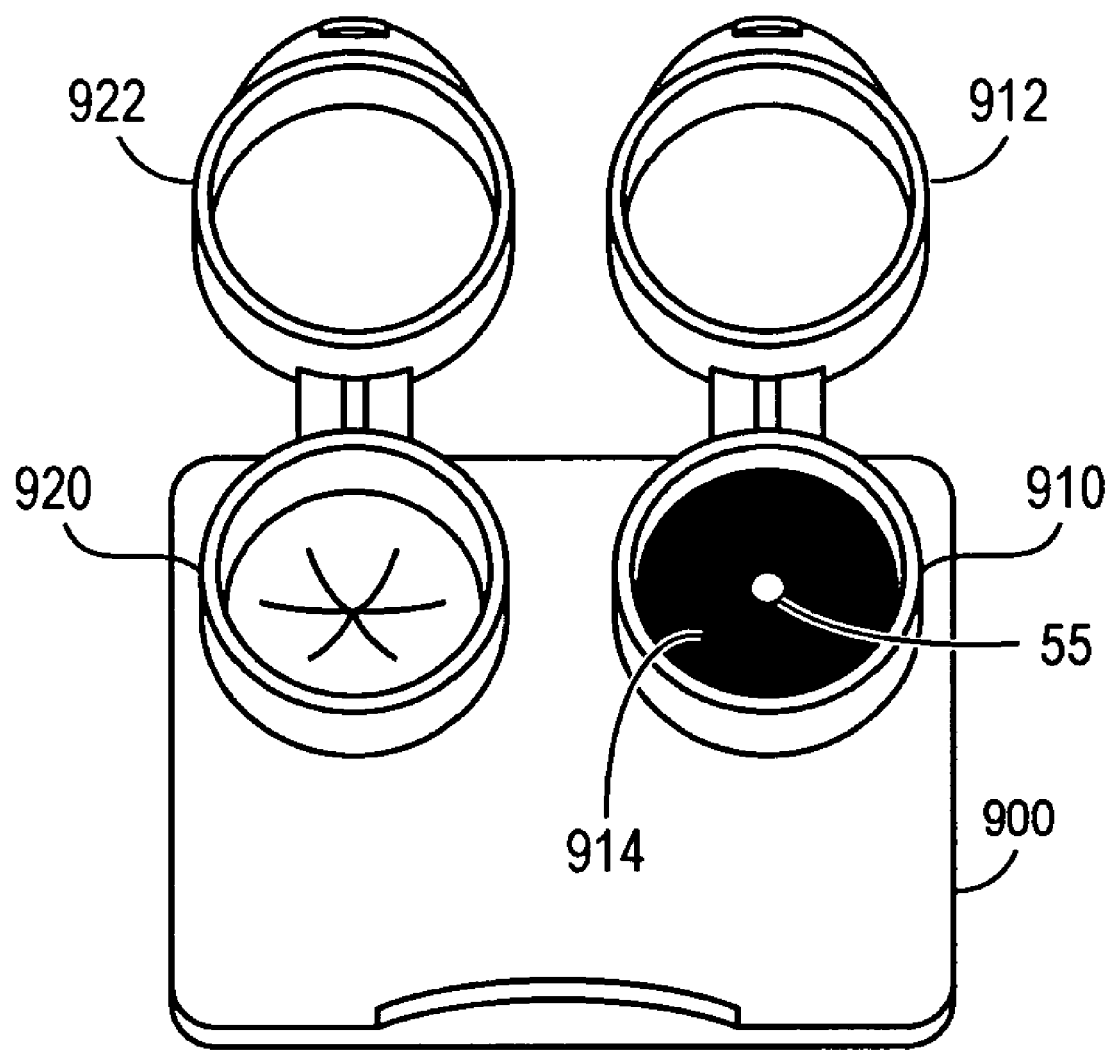
FIG. 8 is a view of two samples of the invention and a carrying case.
Figure 8:
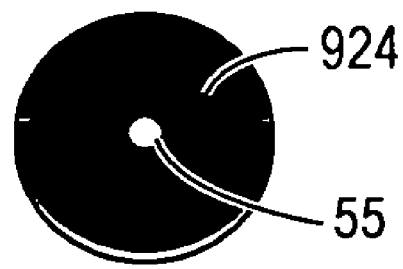

Turning now to FIG. 8, a representative view of the inventive Eye Pal 50 is shown with a carrying case. The carrying case is of the plastic type used for contact lenses, and is of the type commonly sold in drug stores. Carrying case 900 has two wells 910 and 920. Well 910 has a cap 912 which snaps onto well 910 to protect the Eye Pal 914 shown in well 910. Well 920 also has a plastic cap 922 which snaps onto well 920 to protect any Eye Pal carried in well 920. Eye Pal 924 is shown lying on a surface outside of carrying case 900. Aperture 55 is indicated in both Eye Pals 914, 924. Eye Pal 924 may be protected in well 920.

Figure 10:
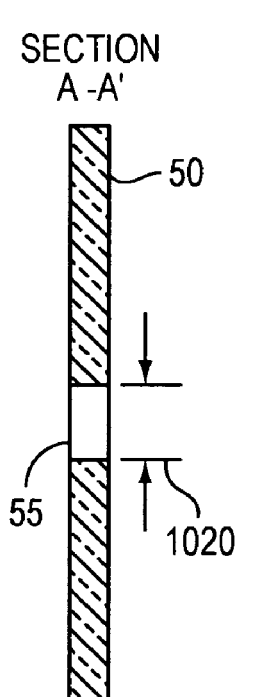
FIG. 10 is a sectional view of the invention along section A-A'.

Turning now to FIG. 9 and FIG. 10, shop drawings of the inventive Eye Pal 50 are shown. FIG. 9 is a front view of the inventive Eye Pal 50, and FIG. 10 is a sectional drawing of FIG. 9, along section A-A'. Eye Pal 50 has an outside diameter 1010 chosen to conveniently fit on commonly worn eyeglasses. A diameter 1010 between about three quarters inch to one inch has been found convenient. Stated in millimeters, diameters 1010 between about 15 millimeters and 25 millimeters have been found convenient.

As shown in FIGS. 9 and 10, aperture 55 has diameter 1020. A preferred diameter 1020 of aperture 55 has been found to be about $45/1000$ of an inch. Expressed in millimeters this diameter is about 1.1 millimeter to 1.6 millimeters. This preferred range of diameter 1020 of aperture 55 has been used on eyeglasses such as shown in FIG. 4, FIG. 5A and FIG. 6.

The optimum diameter 1020 of aperture 55 depends upon the mechanical arrangement of the eyeglasses worn by the person aiming the firearm. When large safety glasses (not shown) which cover ordinary eyeglasses as shown in FIG. 4, FIG. 5A, and FIG. 6, et cet. are worn by the person aiming the firearm, the inventive Eye Pal 50 is moved further away from the pupil of the person's eye 70. In this case, a larger diameter 1020 of aperture 55 may be used, as the solid angle subtended by aperture 55 at the retina (not shown) of the person's eye 70 depends upon both the area of aperture 55 and the square of the distance between the aperture and the person's retina. Moving the inventive Eye Pal 50 further away from the retina then requires a larger diameter 1020 for aperture 55 in order to maintain the same solid angle, as obtained by direct application of the inventive Eye Pal 50 to ordinary vision correcting eyeglasses.

When a smaller diameter 1020 of aperture 55 is used, the image visualized by the person becomes "gray". This effect is spoken of as "graying out", and is believed to be due to diffraction of light at the aperture 55. This "graying out" is an example of optical effects being diffraction limited.

The preferred embodiment of the invention has been found to be a diameter 1020 of about 1.1 to 1.6 millimeters, that is around $45/1000$ inch to $62/1000$ of an inch. When the aperture is moved further away, a larger aperture is indicated, in order to maintain the solid angle subtended by the aperture 55 at the retina of the person aiming the firearm.

The material from which the inventive Eye Pal 50 is made has been found to be conveniently "static cling vinyl". Static cling vinyl in sheets of about 0.010 inch thickness are cut into circular Eye Pals 50 of about ¾ inches diameter, with about a $45/1000$ inch diameter 1020 of aperture 55. Static cling vinyl is available from Grafix Plastics, Cleveland, Ohio, and from other plastics dealers.

Preferably, the inventive Eye Pal 50 is made of opaque material. Opaque material stops light which interferes with the cone of rays passing through the aperture. Only light passing through the aperture is useful in aiming the firearm, and so blocking other light from reaching the person's eye improves the image as the person visualizes the rear sight, front sight, and target.

The surface of the inventive Eye Pal 50 is preferably made a flat finish to reduce reflections. However, the inner surface, toward the eye of the person aiming the firearm, may be made glossy in order to increase adhesion to the surface of the eyeglasses by the static cling vinyl.

Figures 11A, 11B:
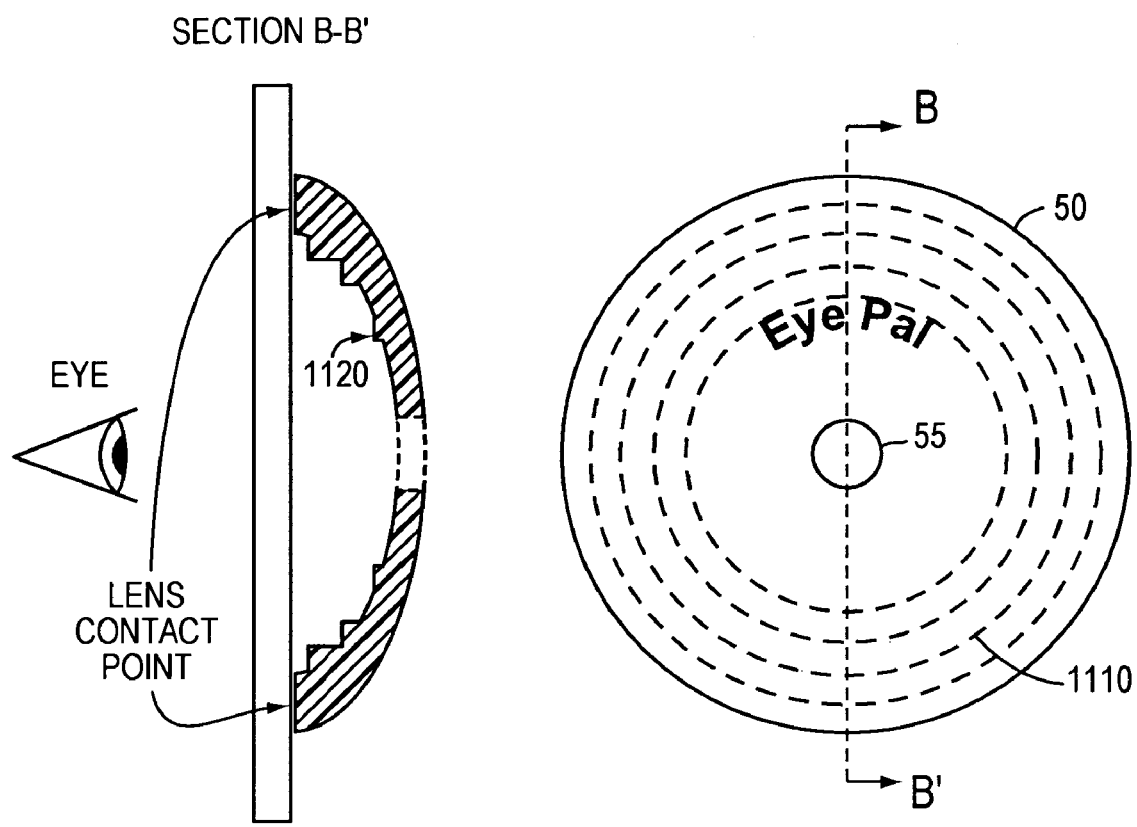
FIG. 11A is a front view of an alternative embodiment of the invention showing section B-B'.
FIG. 11B is a sectional view along section B-B'.

Turning now to FIG. 11A and FIG. 11B, an alternative embodiment of the invention is shown. A mold is used to form by an injection molding process the inventive Eye Pal 50 from a liquid static cling vinyl, and the mold is made to leave a rounded shape to the Eye Pal 50. A stepped inner surface 1120 may be used for strength, and to reduce reflections. Dashed circular lines 1110 show ridges arising from the stepped inner surface illustrated in the sectional view of FIG. 11B. The stepped inner surface 1120 forms rings centered on aperture 55.

Reflections of light from the inner surface 1120 of Eye Pal 50 may interfere with visualization of the sights of the firearm and visualization of the target. Reduction of potential reflections, by circular anti-reflective steps in the inner surface 1120 of Eye Pal 50, improves visualization of the rear sight, front sight, and target by the person using the Eye Pal 50.

Figures 12A, 12B:
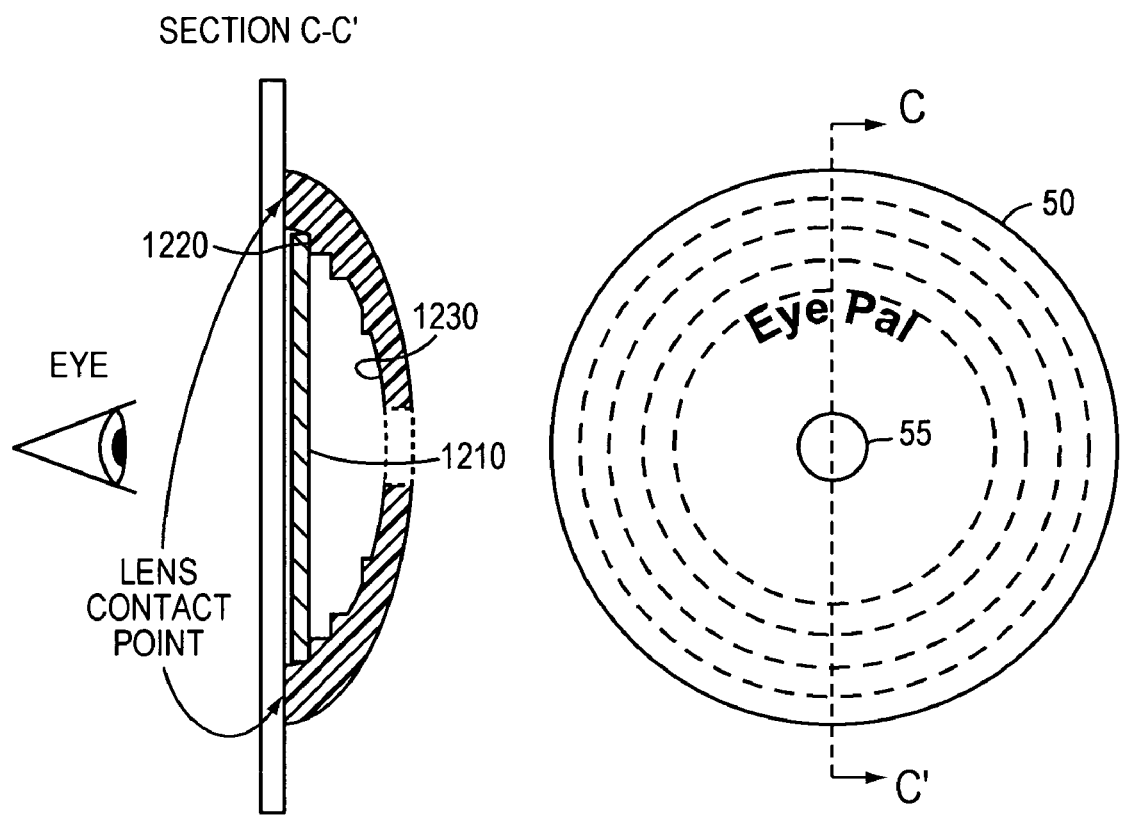
FIG. 12A is front view of an alternative embodiment of the invention, including an optical filter, and showing section C-C'.
FIG. 12B is a sectional view along section C-C'.

Turning now to FIG. 12A and FIG. 12B, a further alternative embodiment of the invention is shown. The alternative embodiment of the invention has an optical filter 1210 is inserted in a step formed on the inner part of the rounded shape of the Eye Pal 50. Means for attaching the optical filter are provided by the stepped ridges 1220 formed on the inner surface 1230 of Eye Pal 50. The optical filter may be color filters, polarizers etc., in order to improve visualization of the target, the rear sight, and front sight. A standard size of optical filter has a diameter of about ½ inch, and the Eye Pal 50 is sized to accept such a standard size optical filter.

Turning now to FIG. 13, an alternative embodiment of the invention is shown, where the aperture 1310 is off center from the Eye Pal 1320 and the shape of the Eye Pal 1320 approximates a portion of a spherical surface. Placement of the aperture off-center improves the ability of a user to position the aperture on his eyeglasses. A larger outer diameter of the Eye Pal 1320 may be used to block stray light, and placement of the aperture off-center permits the aperture to be placed closer to the frame of the person's eyeglasses. A simple rotation of 180 degrees of the Eye Pal 1320 before attachment to the person's eyeglasses allows the inventive Eye Pal 1320 to be used by both left handed and right handed persons.

Turning now to FIG. 14, a front view of the alternative embodiment of Eye Pal 1400 of FIG. 13 is shown. Eye Pal 1400 has aperture 1410 off center. The inventive Eye Pal 1400 may be either flat as shown in FIG. 9 and FIG. 10, or may approximate a portion of a spherical surface as shown in FIGS. 11A, 11B, and FIGS. 12A, 12B, and FIG. 13. The markings "L" and "R" indicate either left handed or right handed use.

Figure 15:
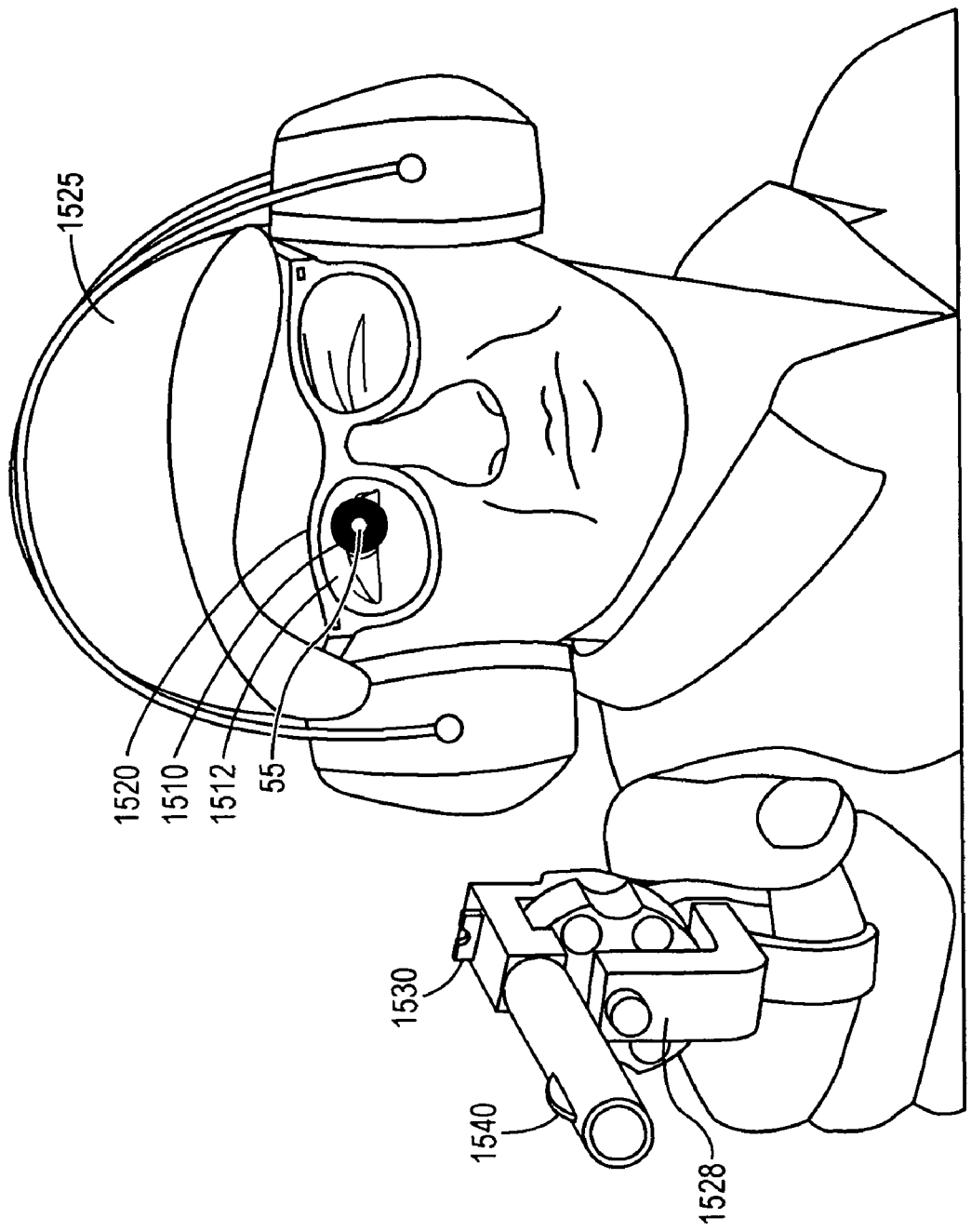
FIG. 15 illustrates use of the invention in aiming a handgun.

Turning now to FIG. 15, use of the inventive Eye Pal 50 in aiming a handgun is shown. The person 1525 is wearing eyeglasses 1520. Eye Pal 1510 is attached to lens 1512 of eyeglasses 1520 by electrostatic attraction between the static cling vinyl of the Eye Pal 1510 and the lens 1512 of eyeglasses 1520. The handgun 1528 has rear sight 1530 and front sight 1540. The aperture 55 of the Eye Pal 1510 helps the person 1525 visualize the rear sight 1530, the front sight 1540, and the target (not shown) as indicated in FIG. 4, and as shown in FIG. 7A.

Figure 16:
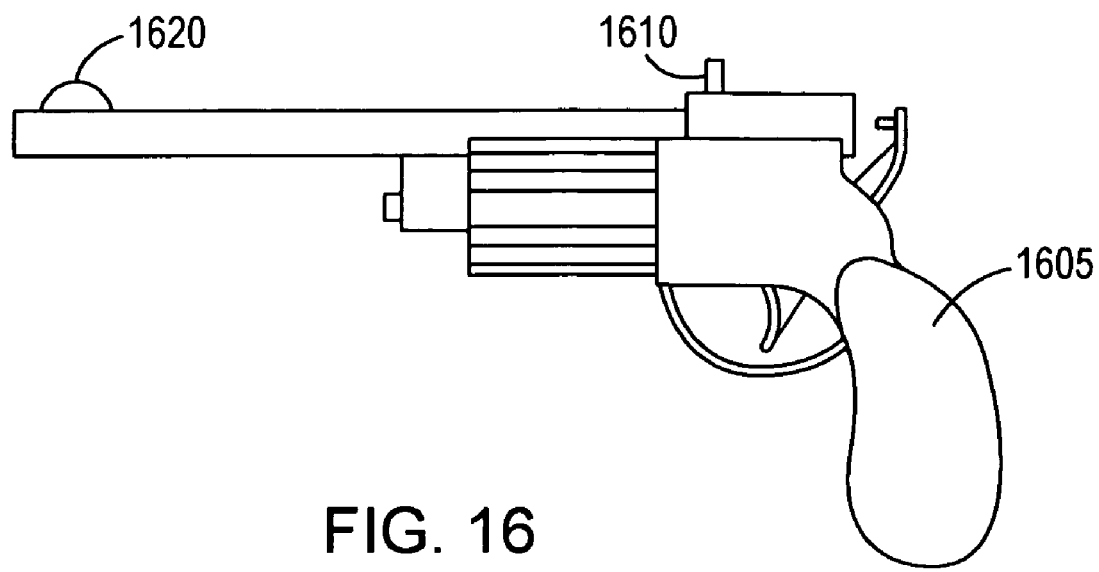
FIG. 16 is a side view of a handgun.
Figure 17:
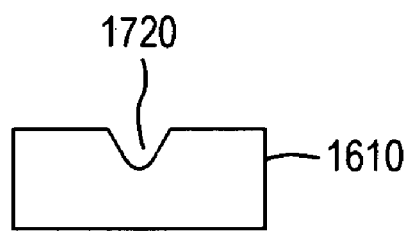
FIG. 17 is an enlarged view of a rear sight of a handgun.

Turning now to FIG. 16, a side view outline drawing of a handgun 1605 is shown. Handgun 1605 has rear sight 1610 and front sight 1620. Front sight 1620 is a blade sight made of a thin sheet of metal. The blade appears to the person aiming the handgun as a vertical shaft given by the thickness of the blade. FIG. 17 gives a front view of the rear sight 1610 of handgun 1605. Rear sight 1610 has triangular grove 1720 which the person aligns with the front sight 1620 and the target (not shown) as illustrated in FIG. 4. The inventive Eye Pal 50 helps the person aiming the handgun to simultaneously visualize the rear sight, the front sight and the target, as illustrated in FIG. 7A.

The foregoing description has been directed to particular embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for aiming a firearm, comprising:

affixing a collimator of static cling vinyl on a lens of eyeglasses by electrostatic attraction, the collimator having an aperture formed as a hole in a flat circle of opaque material, the hole located at a center of the circle of opaque material, the opaque material having a diameter less than a length or width of a lens of the eyeglasses, the eyeglasses to be worn by a person; and generating, by the person wearing the eyeglasses, a sight line from an eye of the person through the aperture of the collimator and through a rear sight of the firearm and across a front sight of the firearm and to a target, the aperture of the collimator optically clearing the vision of the eye of the person to aid in the person's simultaneous visualization of the rear sight, the front sight, and the target.

2. A method for aiming a firearm, comprising:

affixing a collimator of static cling vinyl on a lens of eyeglasses by electrostatic attraction, the collimator having an aperture formed as a hole in a flat circle of opaque material, the hole located at a center of the circle of opaque material, the opaque material having a diameter less than a length or width of a lens of the eyeglasses, the eyeglasses to be worn by a person; and generating a sight line from an eye of the person through the aperture of the collimator and through a rear sight of the firearm and across a front sight of the firearm and to a target, the aperture of the collimator optically clearing the vision of the eye of the person to aid in the person's simultaneous visualization of the rear sight, the front sight, and the target.

3. A method for improving vision, comprising:

affixing a collimator of static cling vinyl on a lens of eyeglasses by electrostatic attraction, the collimator made of opaque material, and having an aperture formed as a hole in a flat circle of the opaque material, the hole located at a center of the circle of opaque material, the opaque material having a diameter less than a length or width of a lens of the eyeglasses, the eyeglasses to be worn by a person; and generating, by the person wearing the eyeglasses, a sight line from an eye of the person through the aperture of the collimator and to an object which it is desired to visualize, the collimator optically clearing the vision of the eye of the person to aid in the person's visualization of the object.

4. The method as in claim 3, further comprising:
using vision correction glasses as the eyeglasses.

5. The method as in claim 3, further comprising:
using prescription safety eyeglasses as the eyeglasses.

6. The method as in claim 3, further comprising:
using bifocals with visible lines between different radii ground into the glasses as the eyeglasses.

7. The method as in claim 3, further comprising:
using safety glasses as the eyeglasses.

8. The method as in claim 3, further comprising:
using sunglasses as the eyeglasses.

* * * * *